(12) United States Patent
Wu et al.

(10) Patent No.: US 10,211,518 B2
(45) Date of Patent: Feb. 19, 2019

(54) MOBILE TERMINAL

(71) Applicant: Guangdong Oppo Mobile Telecommunications Corp., Ltd., Dongguan, Guangdong (CN)

(72) Inventors: Qing Wu, Dongguan (CN); Yuanbin Xiang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/787,858

(22) Filed: Oct. 19, 2017

(65) Prior Publication Data

US 2018/0159205 A1    Jun. 7, 2018

(30) Foreign Application Priority Data

Dec. 7, 2016  (CN) .......................... 2016 1 1118262
Dec. 7, 2016  (CN) ...................... 2016 2 1340998 U

(51) Int. Cl.
| | |
|---|---|
| *H01Q 1/24* | (2006.01) |
| *H01Q 1/52* | (2006.01) |
| *H01Q 9/42* | (2006.01) |
| *H04M 1/02* | (2006.01) |
| *H01Q 21/30* | (2006.01) |

(52) U.S. Cl.
CPC .............. *H01Q 1/243* (2013.01); *H01Q 1/52* (2013.01); *H01Q 9/42* (2013.01); *H01Q 21/30* (2013.01); *H04M 1/0274* (2013.01); *H04M 1/0281* (2013.01)

(58) Field of Classification Search
CPC ... H04Q 1/243; H04M 1/0274; H04M 1/0281
See application file for complete search history.

(56) References Cited

U.S. PATENT DOCUMENTS

| | | | | |
|---|---|---|---|---|
| 7,953,371 | B2 * | 5/2011 | Lee ...................... | G06F 13/385 |
| | | | | 455/41.2 |
| 8,554,154 | B1 * | 10/2013 | Everson .................. | H01Q 1/24 |
| | | | | 455/557 |
| 8,805,459 | B2 * | 8/2014 | Pohlabeln .............. | H01Q 1/242 |
| | | | | 455/575.1 |
| 9,716,307 | B2 * | 7/2017 | Tsai ...................... | H01Q 1/243 |

(Continued)

FOREIGN PATENT DOCUMENTS

| CN | 102856629 A | 1/2013 |
|---|---|---|
| CN | 105514604 A | 4/2016 |

(Continued)

*Primary Examiner* — Lewis G West
(74) *Attorney, Agent, or Firm* — Hodgson Russ LLP

(57) ABSTRACT

A mobile terminal includes an external interface body, an antenna assembly, and a first filter unit. The antenna assembly includes a first antenna, a second antenna, and a diplexer. The external interface body is disposed in an antenna clearance area defined by the first antenna and the second antenna. The diplexer is connected to the first antenna, the second antenna, and a feed of a board of the mobile terminal. The first filter unit is disposed between the first antenna and the external interface body and is connected to a first circuit board of the external interface body to reduce interference from the external interface body to the antenna assembly.

15 Claims, 6 Drawing Sheets

(56) References Cited

U.S. PATENT DOCUMENTS

| | | | | |
|---|---|---|---|---|
| 2012/0122522 A1* | 5/2012 | Jang | ........................ | H01Q 1/10 |
| | | | | 455/557 |
| 2013/0078932 A1* | 3/2013 | Asrani | ................... | H01Q 1/243 |
| | | | | 455/90.3 |
| 2015/0045089 A1 | 2/2015 | He | | |
| 2015/0119102 A1 | 4/2015 | Saji et al. | | |
| 2015/0155614 A1* | 6/2015 | Youn | ................... | H04M 1/0249 |
| | | | | 343/702 |
| 2016/0056527 A1* | 2/2016 | Pascolini | ........... | G06K 9/00006 |
| | | | | 343/702 |
| 2016/0056531 A1* | 2/2016 | Lee | ........................ | H01Q 7/00 |
| | | | | 343/702 |
| 2016/0064812 A1* | 3/2016 | Han | ........................ | H01Q 1/50 |
| | | | | 343/702 |
| 2016/0064820 A1* | 3/2016 | Kim | ....................... | H01Q 1/243 |
| | | | | 343/767 |

FOREIGN PATENT DOCUMENTS

| | | |
|---|---|---|
| CN | 106657467 A | 5/2017 |
| CN | 206251152 U | 6/2017 |

\* cited by examiner

MOBILE TERMINAL

CROSS REFERENCE TO RELATED APPLICATIONS

This application claims priority to Chinese Application No. 201611118262.3 filed Dec. 7, 2016 and Chinese Application No. 201621340998.0 filed Dec. 7, 2016. The entire disclosures of the above applications are incorporated herein by reference.

BACKGROUND

Field

The present disclosure relates to the field of mobile terminal manufacturing technologies, and particularly to a mobile terminal.

Background

Following the continuous development of long term evolution (LTE) intelligent mobile terminals, mobile terminals can carry out more and more functions, such as fingerprint unlocking, fingerprint payment, etc. The functions have gradually become a standard function in the mobile terminals. In present technology, a fingerprint identification module is disposed on a front of a mobile terminal and is integrated with a home key of the mobile terminal for improving user experience. However, an earphone is disposed at a bottom of the mobile terminal and in an antenna clearance area, and an antenna is disposed near the earphone. The antenna may be a global system for mobile communications (GSM) antenna having a large radiation, such that mutual interference between audio and the antenna becomes large. Conventional technologies such as isolating a signal line with a ground and trace designs arounds, etc. are difficult to solve the issue of mutual interference with the trend of the mobile terminal being light weight and having a thin profile, such as a mobile phone, etc. Therefore, there are defects existing in the conventional technologies which need to be improved.

BRIEF DESCRIPTION OF THE DRAWINGS

Advantages of the present disclosure will be apparent and understood easily from the description in conjunction with embodiments of the following drawings.

DETAILED DESCRIPTION OF ILLUSTRATED EMBODIMENTS

Figure 1:
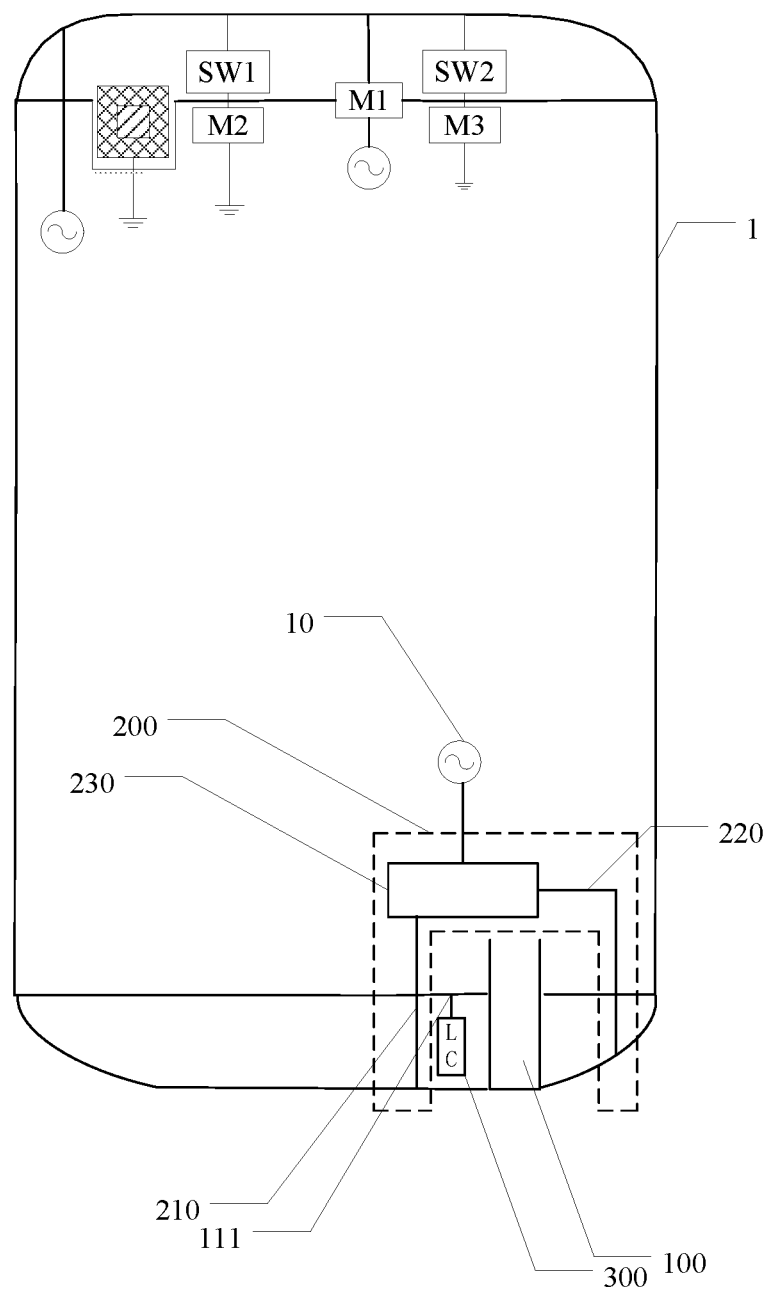
FIG. 1 is a schematic view of a mobile terminal according to an embodiment of the present disclosure.

The embodiments of the present disclosure are described in detail hereinafter. Examples of the described embodiments are given in the accompanying drawings, wherein the identical or similar reference numerals constantly denote the identical or similar elements or elements having the identical or similar functions. The specific embodiments described with reference to the attached drawings are all exemplary, and are intended to illustrate and interpret the present disclosure, which shall not be construed as causing limitations to the present disclosure.

A mobile terminal in the embodiments of the present disclosure will be further described in detail in combination with the accompanying drawings hereinafter.

Referring to FIG. 1, FIG. 1 is a schematic view of a mobile terminal according to an embodiment of the present disclosure. The mobile terminal 1 according to an embodiment of the present disclosure includes an external interface body 100, an antenna assembly 200, and a first filter unit 300. The antenna assembly 200 includes a first antenna 210, a second antenna 220, and a diplexer 230. The external interface body 100 is disposed in an antenna clearance area defined by the first antenna 210 and the second antenna 220. The diplexer 230 is connected to the first antenna 210, the second antenna 220, and a feed 10 of a board of the mobile terminal 1.

It is to be noted that the mobile terminal 1 includes four sides, such as top, bottom, left, and right sides. The external interface body 100 and the antenna assembly 200 may be disposed at the same side of the mobile terminal 1, for example, the same side may be the top side or the bottom side of the mobile terminal 1. The external interface body 100 and the antenna assembly 200 are for example disposed at the bottom side of the mobile terminal 1. In detail, the first antenna 210, the second antenna 220, and the external interface body 100 are disposed at the bottom side of the mobile terminal 1.

It is to be understood that the first antenna 210 and the second antenna 220 may include a wide range of antennas. For example, the first antenna 210 may be a low frequency antenna and the second antenna 220 may be a mid-high frequency antenna. A frequency range of the first antenna 210 may be in a range of 824 MHz to 960 MHz and a frequency range of the second antenna 220 may be in a range of 1710 MHz to 2690 MHz.

In order to save space and facilitate layout of the antenna assembly 200, the diplexer 230 may be disposed at a top of the external interface body 100. In detail, as shown in FIG. 1, the diplexer 230 may be disposed above the external interface body 100 and the diplexer 230 is adjacent to the external interface body 100.

It is to be understood that the first antenna 210 and the second antenna 220 are connected to the feed 10 of the board of the mobile terminal 1 via the diplexer 230. The diplexer 230 may combine signals received by the first antenna 210 and the second antenna 220.

Referring to FIG. 1, the first filter unit 300 is disposed between the first antenna 210 and the external interface body 100 and is connected to a first circuit board 111 of the external interface body 100 to reduce interference from the external interface body 100 to the antenna assembly 200. The first circuit board 111 may be a microphone pin, a detection pin, or a ground pin.

It is to be understood that the first circuit board 111 may be disposed according to a plurality of positions. For example, the first circuit board 111 may be disposed between the external interface body 100 and the diplexer 230. The first circuit board 111 may be disposed between the first antenna 210 and the external interface body 100. In order to avoid interference between the antenna assembly 200 and the external interface body 100, as an example, the first circuit board 111 may be disposed between the first antenna 210 and the external interface body 100. The first circuit board 111 may be, for example, a pin disposed in the antenna clearance area.

Figure 2:
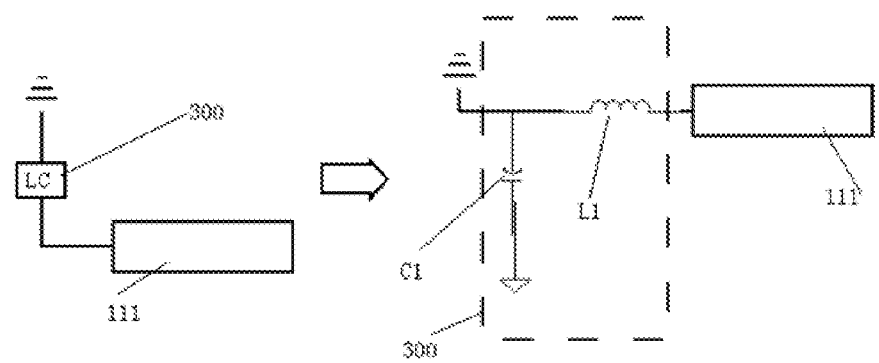
FIG. 2 is a schematic view illustrating a first filter unit in connection between a ground of a board and a first circuit board according to an embodiment of the present disclosure.

It is to be understood that the first filter unit 300 may be near to and connected in series with a pin of the external interface body 100, and the pin is for example disposed in the antenna clearance area. The first filter unit 300 is connected to a ground of the board. Referring to FIG. 2, FIG. 2 is a schematic view illustrating the first filter unit 300 in connection between the ground of the board and the first circuit board 111. FIG. 2 is also a partially schematic view of the first filter unit 300 according to an embodiment of the present disclosure. The first filter unit 300 includes a capacitor C1 and an inductor L1, an end of the inductor L1 is connected to the first circuit board 111, another end of the inductor L1 is connected to an end of the capacitor C1, and another end of the capacitor C1 is connected to the ground of the board.

The first circuit board 111 of the external interface body 100 disposed in the antenna clearance area is near to and connected in series with the first filter unit 300, therefore the first filter unit 300 can cut off a radio frequency of an adjacent antenna with large radiation power coupled to the external interface body 100. The adjacent antenna may be a global system for mobile communications (GSM) antenna. The external interface body 100 forms a suspension body and thus reduces influence of the external interface body 100 to the antenna. Parasitic current, which may interfere with audio signal and charging signal, etc., is filtered by the first filter unit 300 and flows to the ground, thus preventing antenna radiation from coupling to a RF signal of the external interface body 100, causing interference to audio and charging to be improved.

In some embodiments of the present disclosure, the external interface body 100 is an earphone socket and the mobile terminal in the embodiments of the present disclosure will be further described in detail in combination with FIG. 3 to FIG. 5 hereinafter.

Figure 3:
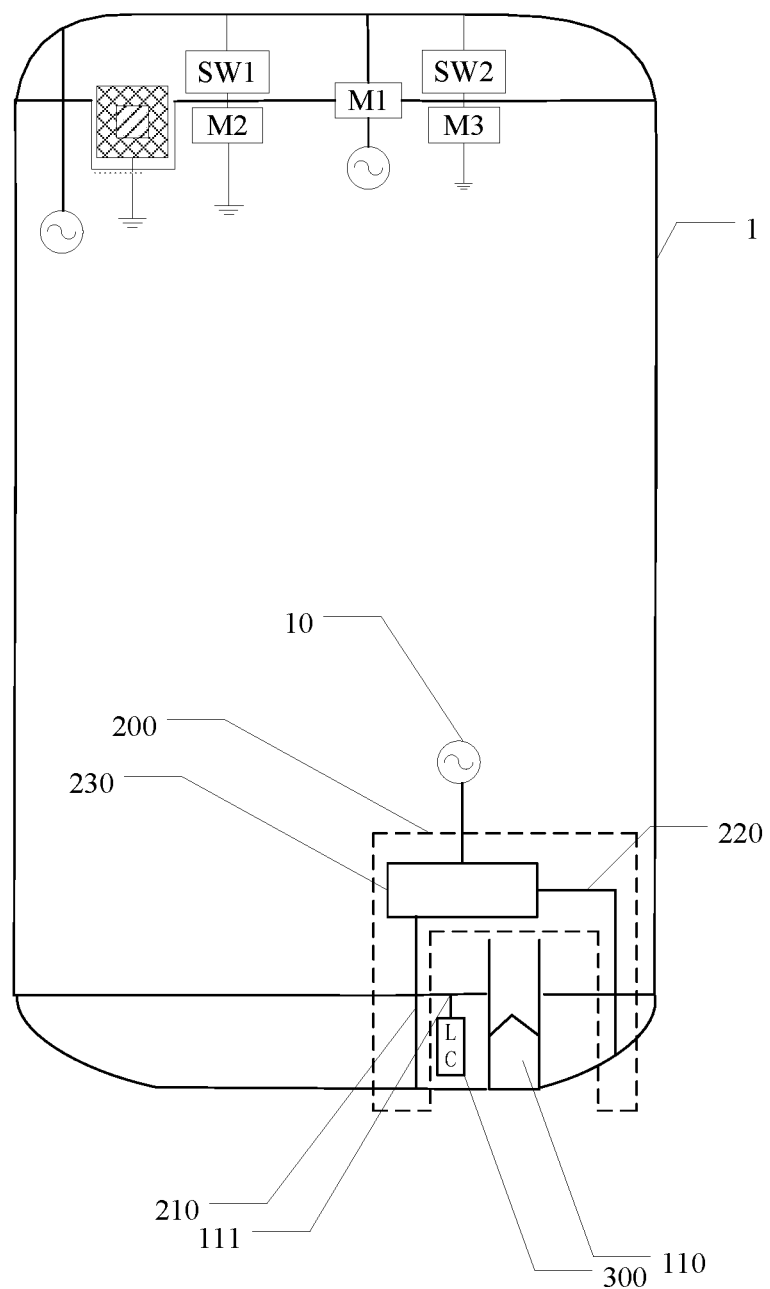
FIG. 3 is a schematic view of a mobile terminal according to another embodiment of the present disclosure.

Referring to FIG. 3, FIG. 3 is a schematic view of a mobile terminal according to another embodiment of the present disclosure. The mobile terminal 1 includes an earphone socket 110, the antenna assembly 200, and the first filter unit 300. The antenna assembly 200 includes the first antenna 210, the second antenna 220, and the diplexer 230. The earphone socket 110 is disposed in the antenna clearance area defined by the first antenna 210 and the second antenna 220. The first antenna 210 is disposed on a side of the earphone socket 110 and the second antenna 220 is disposed on another side of the earphone socket 110. The diplexer 230 is connected to the first antenna 210, the second antenna 220, and the feed 10 of the board of the mobile terminal 1.

In order to save space and facilitate layout of the antenna assembly 200, the diplexer 230 may be disposed at a top of the earphone socket 110.

It is to be understood that the first antenna 210 and the second antenna 220 may include a wide range of antennas. For example, the first antenna 210 may be a low frequency antenna and the second antenna 220 may be a mid-high frequency antenna. A frequency range of the first antenna 210 may be in a range of 824 MHz to 960 MHz and a frequency range of the second antenna 220 may be in a range of 1710 MHz to 2690 MHz.

Referring to FIG. 3, the first filter unit 300 is disposed between the first antenna 210 and the earphone socket 110 and is connected to a first circuit board 111 of the earphone socket 110 to reduce interference from the earphone socket 110 to the antenna assembly 200.

Figure 4:
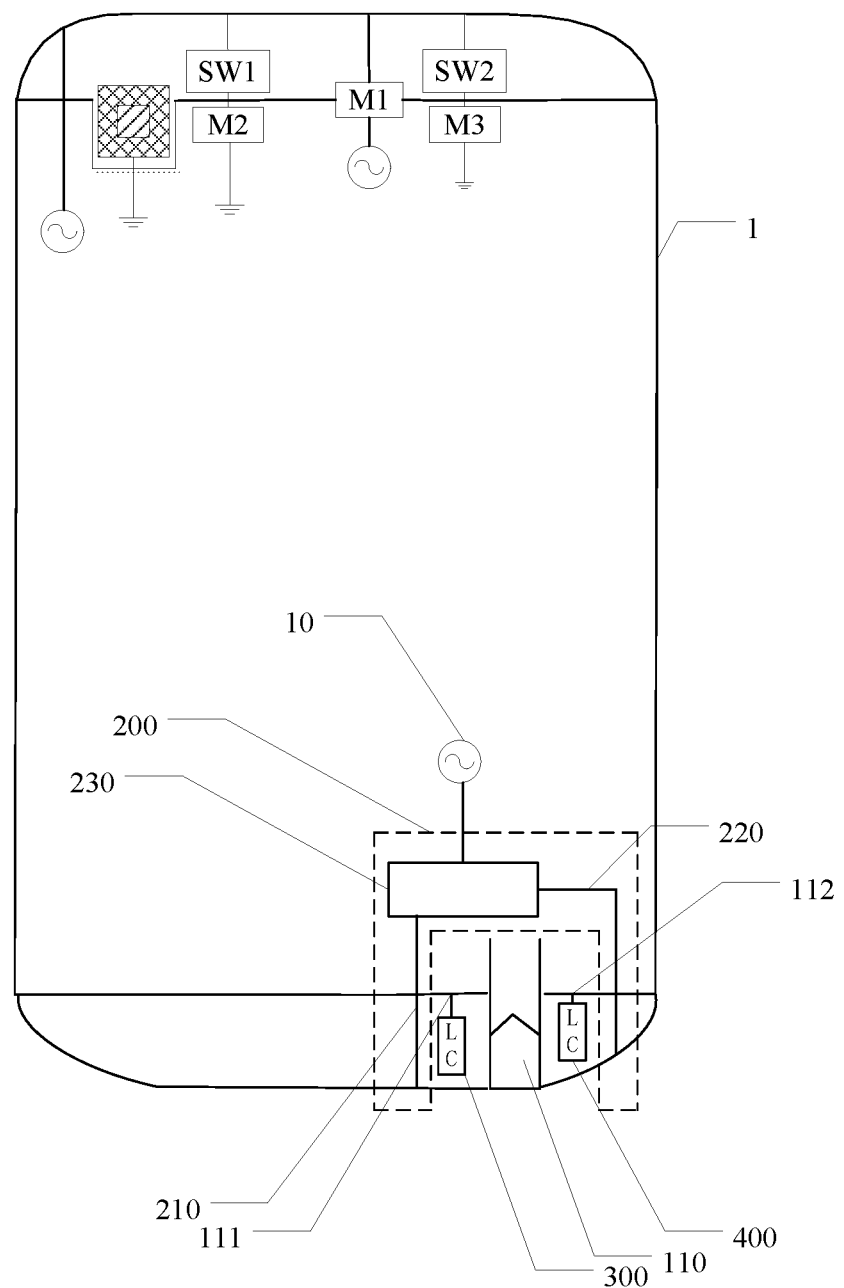
FIG. 4 is a schematic view of a mobile terminal according to yet another embodiment of the present disclosure.

In order to further effectively avoid interference between the antenna and the audio, referring to FIG. 4, in an embodiment of the present disclosure, the mobile terminal further includes a second filter unit 400 disposed between the second antenna 220 and the earphone socket 110. The second filter unit 400 is connected to a second circuit board 112 of the earphone socket 110 to reduce interference from the earphone socket 110 to the antenna assembly 200. The second circuit board 112 is disposed between the second antenna 220 and the earphone socket 110. The second filter unit 400 is connected to the ground of the board. The second circuit board 112 may be a microphone pin, a detection pin or a ground pin.

As an example, the second circuit board 112 may be disposed between the second antenna 220 and the earphone socket 110. The second circuit board 112 may be for example a pin disposed in the antenna clearance area.

It is to be understood that a plurality of circuit boards (i.e., pins) of the earphone socket 110 fall into the antenna clearance area, a corresponding number of filter units may be corresponding to a number of the pins falling into the antenna clearance area. Position and structure of the filter units are similar to those of the first filter unit 300 and the second filter unit 400, but objects to be connected are different.

Figure 5:
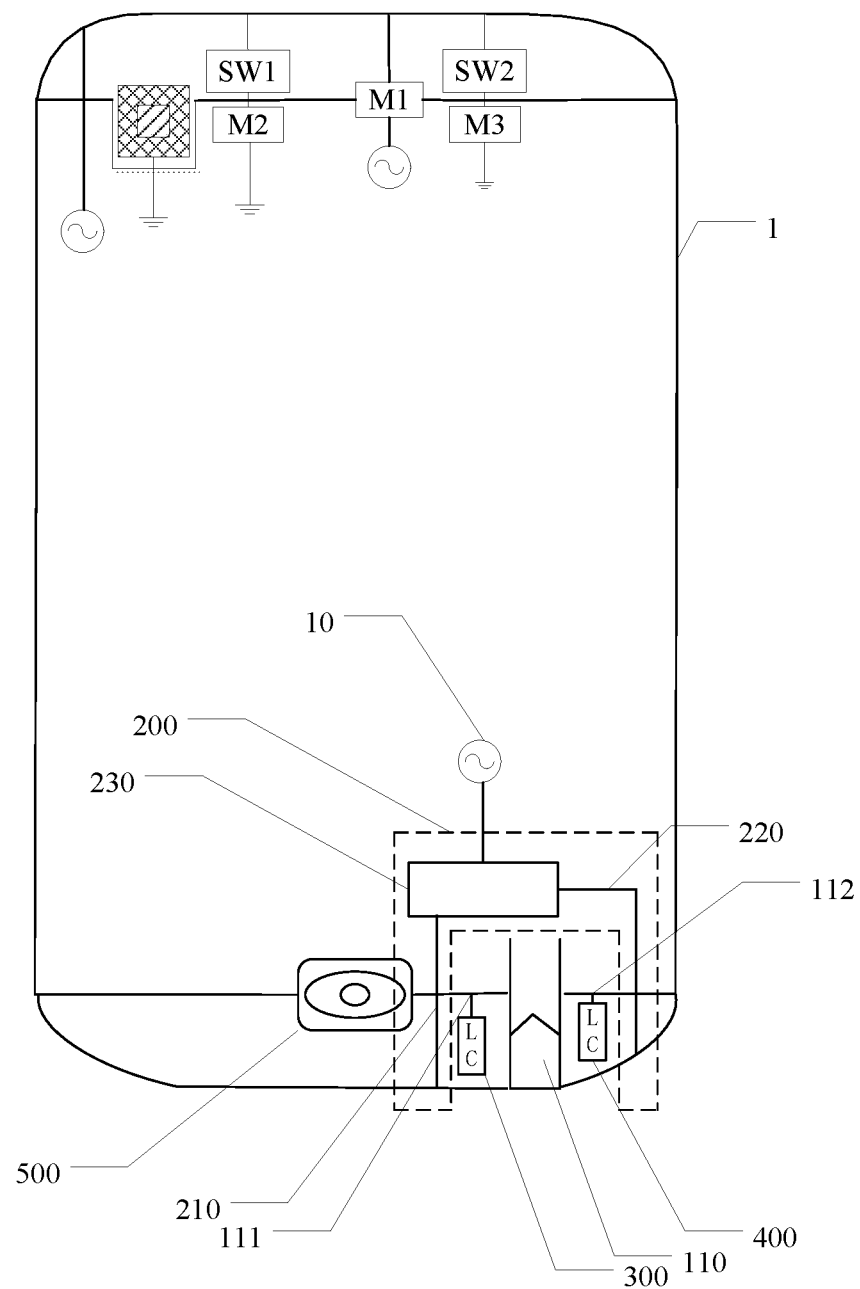
FIG. 5 is a schematic view of a mobile terminal according to still another embodiment of the present disclosure.

In order to improve availability and feasibility of the mobile terminal, as an example, as shown in FIG. 5, the mobile terminal 1 may further include a fingerprint assembly 500. The first antenna 210 may be disposed between the fingerprint assembly 500 and the earphone socket 110. The fingerprint assembly 500 may be a front fingerprint module of the mobile terminal 1.

It is to be understood that the fingerprint assembly 500 may be disposed just below a front of the mobile terminal 1. The fingerprint assembly 500 may be used to acquire and identify a user's fingerprint. The user's fingerprint is identified by the fingerprint assembly 500 and various functions such as fingerprint unlock, fingerprint payment, etc. can be realized by the user's fingerprint.

The first antenna 210 is disposed on a side of the earphone socket 110 and the second antenna 220 is disposed on another side of the earphone socket 110. The diplexer 230 is connected to the first antenna 210, the second antenna 220, and the feed 10 of the board of the mobile terminal 1. The first filter unit 300 is disposed between the first antenna 210 and the earphone socket 110 and is connected to a first circuit board 111 of the earphone socket 110. A circuit board of the earphone socket 110 is near to and connected in series with a filter unit, therefore the filter unit can cut off a radio frequency of an adjacent antenna (e.g., a GSM antenna) with large radiation power coupled to the earphone socket 110. The earphone socket 110 forms a suspension body and thus reduces influence of the earphone socket 110 to the antenna. Parasitic current, which may interfere with audio, is filtered by the filter unit and flows to the ground, thus preventing antenna radiation from coupling to a RF signal of the earphone socket 110, causing interference to audio to be improved.

In an embodiment of the present disclosure, the external interface body 100 is a universal serial bus (USB) interface body and the mobile terminal in the embodiment of the present disclosure will be further described in detail in combination with FIG. 6 hereinafter.

Figure 6:
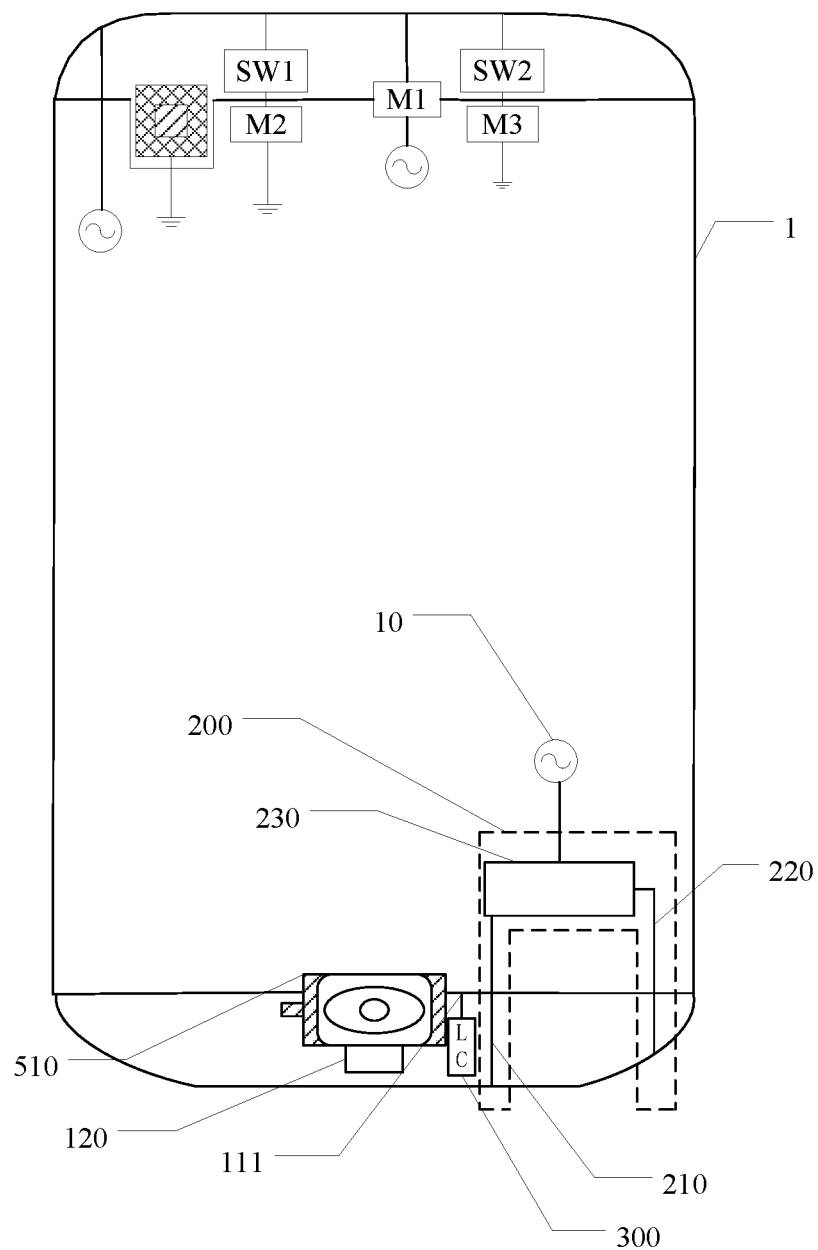
FIG. 6 is a schematic view of a mobile terminal according to still another embodiment of the present disclosure.

Referring to FIG. 6, FIG. 6 is a schematic view of a mobile terminal according to still another embodiment of the present disclosure. The mobile terminal 1 includes a USB interface body 120, the antenna assembly 200, and the first filter unit 300. The antenna assembly 200 includes the first antenna 210, the second antenna 220, and the diplexer 230. The USB interface body 120 is disposed in the antenna clearance area defined by the first antenna 210 and the second antenna 220. The second antenna 220 is disposed on a side of the USB interface body 120 and the first antenna 210 is disposed between the USB interface body 120 and the second antenna 220. The diplexer 230 is connected to the first antenna 210, the second antenna 220, and the feed 10 of the board of the mobile terminal 1.

In order to save space and facilitate layout of the antenna assembly 200, the diplexer 230 may be disposed at a top of the USB interface body 120.

It is to be understood that the first antenna 210 and the second antenna 220 may include a wide range of antennas. For example, the first antenna 210 may be a low frequency antenna and the second antenna 220 may be a mid-high frequency antenna. A frequency range of the first antenna 210 may be in a range of 824 MHz to 960 MHz and a frequency range of the second antenna 220 may be in a range of 1710 MHz to 2690 MHz.

Referring to FIG. 6, the first filter unit 300 is disposed between the first antenna 210 and the USB interface body 120 and is connected to a first circuit board 111 of the USB interface body 120 to reduce interference from the USB interface body 120 to the antenna assembly 200. The first circuit board 111 may be a microphone pin, a detection pin, or a ground pin.

It is to be understood that the first filter unit 300 may be near to and connected in series with a pin of the USB interface body 120, and the pin is for example disposed in the antenna clearance area. The first filter unit 300 is connected to a ground of the board. Referring to FIG. 2, FIG. 2 is a schematic view illustrating the first filter unit 300 in connection between the ground of the board and the first circuit board 111 and a partially schematic view of the first filter unit 300 according to an embodiment of the present disclosure. The first filter unit 300 includes a capacitor C1 and an inductor L1, an end of the inductor L1 is connected to the first circuit board 111, another end of the inductor L1 is connected to an end of the capacitor C1, and another end of the capacitor C1 is connected to the ground of the board.

As an example, the mobile terminal 1 further includes a fingerprint assembly, and the USB interface body 120 may be disposed above a fingerprint tray 510 of the fingerprint assembly.

A circuit board of the USB interface body 120 disposed in the antenna clearance area is near to and connected in series with the first filter unit 300, therefore the first filter unit 300 can cut off radio frequency of an adjacent antenna (e.g., a GSM antenna) with large radiation power coupled to the USB interface body 120. The USB interface body 120 forms a suspension body and thus reduces influence of the USB interface body 120 to the antenna. Parasitic current, which may interfere with charging signal, is filtered by the first filter unit 300 and flows to the ground, thus preventing antenna radiation from coupling to a RF signal of the USB interface body 120, causing interference to charging and data transmission, etc. to be improved.

In the description of the present disclosure, it should be understood that terms such as "center," "longitudinal," "lateral," "length," "width," "thickness," "upper," "lower," "front," "rear," "left," "right," "vertical," "horizontal," "top," "bottom," "inside," "outside," "clockwise," "counter-clockwise," "axial," "radial," "circumferential" as well as derivative thereof should be construed to refer to the orientation as then described or as shown in the drawings under discussion. These relative terms are for convenience of description, do not require that the present disclosure be constructed or operated in a particular orientation, and shall not be construed as causing limitations to the present disclosure.

In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two, unless otherwise specified.

In the description of the present disclosure, unless specified or limited otherwise, it should be noted that, terms "mounted," "connected," "coupled," and "fastened," etc. may be understood broadly, such as permanent connection or detachable connection, mechanical connection or electronic connection, direct connection or indirect connection via intermediary, inner communication or interreaction between two elements. A person skilled in the art should understand the specific meanings in the present disclosure according to specific situations.

In the description of the present disclosure, unless specified or limited otherwise, it should be noted that, a structure in which a first feature is "on" a second feature may include an embodiment in which the first feature directly contacts the second feature, and may also include an embodiment in which an additional feature is formed between the first feature and the second feature so that the first feature does not directly contact the second feature. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature has a sea level elevation greater than the sea level elevation of the second feature. While first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature has a sea level elevation less than the sea level elevation of the second feature.

In the description of this specification, the description of the terms "one embodiment," "some embodiments," "examples," "specific examples," or "some examples," etc., means to refer to the specific feature, structure, material or characteristic described in connection with the embodiments or examples being included in at least one embodiment or example of the present disclosure. In the present specification, the term of the above schematic representation is not necessary for the same embodiment or example. Furthermore, the specific feature, structure, material, or characteristic described may be in combination in a suitable manner in any one or more of the embodiments or examples. In addition, it will be apparent to a person skilled in the art that different embodiments or examples described in this specification, as well as features of different embodiments or examples, may be combined without contradictory circumstances.

The foregoing descriptions are merely exemplary embodiments of the present disclosure, rather than limiting the present disclosure. Various modifications and alterations may be made to the present disclosure for a person skilled in the art. Any modification, equivalent substitution, improvement or the like made within the spirit and principle of the present disclosure shall fall into the protection scope of the present disclosure.

What is claimed is:

1. A mobile terminal, comprising:
an external interface body;
an antenna assembly, comprising:
a first antenna and a second antenna, wherein the external interface body is disposed in an antenna clearance area defined by the first antenna and the second antenna; and
a diplexer connected to the first antenna, the second antenna, and a feed of a board of the mobile terminal; and
a first filter unit disposed between the first antenna and the external interface body, wherein the first filter unit is connected to a first circuit board of the external interface body to reduce interference from the external interface body to the antenna assembly; and
a second filter unit;
wherein the external interface body is an earphone socket, the first antenna is disposed on a side of the earphone socket and the second antenna is disposed on another side of the earphone socket, and the second filter unit is disposed between the second antenna and the earphone socket and is connected to a second circuit board of the earphone socket to reduce interference from the earphone socket to the antenna assembly.

2. The mobile terminal as claimed in claim 1, wherein the first circuit board is disposed between the first antenna and the external body.

3. The mobile terminal as claimed in claim 1, wherein the second circuit board is disposed between the second antenna and the earphone socket.

4. The mobile terminal as claimed in claim 3, wherein when the diplexer and the external interface body are arranged at a bottom side of the mobile terminal, the diplexer is further away from the bottom side than the external interface body; and when the diplexer and the external interface body are arranged at a top side of the mobile terminal, the diplexer is further away from the top side than the external interface body.

5. The mobile terminal as claimed in claim 1, wherein the first antenna is a low frequency antenna and the second antenna is a mid-high frequency antenna.

6. The mobile terminal as claimed in claim 1, further comprising a fingerprint assembly, wherein the first antenna is disposed between the fingerprint assembly and the earphone socket.

7. The mobile terminal as claimed in claim 1, wherein the first filter unit is connected to a ground of the board.

8. The mobile terminal as claimed in claim 1, wherein the second filter unit is connected to a ground of the board.

9. The mobile terminal as claimed in claim 1, wherein a frequency range of the first antenna is in a range of 824 MHz to 960 MHz, and a frequency range of the second antenna is in a range of 1710 MHz to 2690 MHz.

10. The mobile terminal as claimed in claim 1, wherein when the diplexer and the external interface body are arranged at a bottom side of the mobile terminal, the diplexer is further away from the bottom side than the external interface body; and when the diplexer and the external interface body are arranged at a top side of the mobile terminal, the diplexer is further away from the top side than the external interface body.

11. The mobile terminal as claimed in claim 1, wherein the first circuit board is disposed between the external interface body and the diplexer.

12. The mobile terminal as claimed in claim 1, wherein the first circuit board is disposed in the antenna clearance area defined by the first antenna and the second antenna and the first circuit board is a microphone pin, a detection pin or a ground pin.

13. The mobile terminal as claimed in claim 1, wherein the first filter unit comprises a capacitor and an inductor, an end of the inductor is connected to the first circuit board, another end of the inductor is connected to an end of the capacitor, and another end of the capacitor is connected to a ground of the board.

14. The mobile terminal as claimed in claim 1, further comprising a plurality of filter units, the earphone socket comprising a plurality of pins, a number of the filter units being corresponding to a number of the pins of the earphone socket, and the pins of the earphone socket are disposed in the antenna clearance area.

15. The mobile terminal as claimed in claim 6, wherein the external interface body is a universal serial bus (USB) interface body, the fingerprint assembly comprises a fingerprint tray, when the USB interface body and the fingerprint tray are arranged at a bottom side of the mobile terminal, the USB interface body is disposed further away from the bottom side than the fingerprint tray.

* * * * *